United States Patent [19]
Yagi et al.

[11] Patent Number: 5,378,983
[45] Date of Patent: Jan. 3, 1995

[54] SCANNING TUNNELING POTENTIO-SPECTROSCOPIC MICROSCOPE AND A DATA DETECTING METHOD

[75] Inventors: Akira Yagi, Sagamihara; Takao Okada, Hachioji; Seizo Morita, Miyano; Nobuo Mikoshiba, Sendai, all of Japan

[73] Assignee: Olympus Optical Co., Ltd., Tokyo, Japan

[21] Appl. No.: 977,572

[22] Filed: Nov. 17, 1992

Related U.S. Application Data

[62] Division of Ser. No. 585,880, Sep. 20, 1990, Pat. No. 5,185,572.

[30] Foreign Application Priority Data

Sep. 28, 1989 [JP] Japan ................... 1-252587
Dec. 25, 1989 [JP] Japan ................... 1-332858

[51] Int. Cl.$^6$ ............................... G01K 1/16
[52] U.S. Cl. ............................ 324/158.1; 324/73.1; 324/754
[58] Field of Search ............. 324/158 R, 158 F, 725, 324/73.1; 250/306, 307, 423 F; 356/400, 396

[56] References Cited

U.S. PATENT DOCUMENTS

| | | | |
|---|---|---|---|
| 4,823,004 | 4/1989 | Kaiser et al. | 250/307 |
| 4,870,352 | 9/1989 | Koechner | 250/307 |
| 4,939,363 | 7/1990 | Bando et al. | 250/307 |
| 4,941,753 | 7/1990 | Wickramasinge | 250/307 |
| 5,001,409 | 3/1991 | Hosaka et al. | 250/306 |

FOREIGN PATENT DOCUMENTS 0408009 1/1991 European Pat. Off. .

OTHER PUBLICATIONS

Japanese Journal of Applied Physics, vol. 28, No. 11, part 2, pp. L2034–L2036, Tokyo, JP; S. Morita et al: "Scanning tunneling potentiometryl/spectroscopy (STP/STS)".
Review of Scientific Instruments, vol. 60, No. 3, Mar. 1989, pp. 301–305, New York, N.Y., U.S.; J. P. Pelz et al: "Extremely low-noise potentiometry with a scanning tunneling microscope".
Review of Scientific Instruments, vol. 59, No. 8, part I, Aug. 1988, pp. 1290–1293, New York, N. Y., U.S.: R. Christanell et al: "New high–resolution conductance bridge for tunneling spectroscopy".
Phys. Rev. Lett. vol. 56, No. 18, May 5, 1986, pp. 1972–1975.
J. Vac. Sci. Technol. A6(2), Mar./Apr. 1988, pp. 344–348. IBM J. Res. Develop. vol. 30, No. 4, Jul. 1986, pp. 355–369.
IBM J. Res. Develop. vol. 30, No. 5, Sep. 1986, pp. 443–450.
Phys. Rev. Lett. vol. 60, No. 15, Apr. 11, 1988, pp. 1546–1549.
Appl. Phys. Lett 48(8), Feb. 24, 1986, pp. 514–516.
Appl. Phys. Lett 49(21), Nov. 24, 1986, pp. 1441–1443.

*Primary Examiner*—Vinh Nguyen
*Attorney, Agent, or Firm*—Frishauf, Holtz, Goodman & Woodward

[57] ABSTRACT

A scanning tunneling potentio-spectroscopic microscope, includes a conductive probe and a circuit for selectively applying one of first, second and third bias voltages to a sample. A tunnel current flowing between the probe and sample is detected, and a tunnel current signal is produced upon detection thereof. A servo circuit controls a distance between the probe and sample on the basis of the tunnel current signal by producing a servo signal as a feedback signal. A hold circuit switches the servo circuit between operating and non-operating states. Configuration data on a surface of the sample is obtained, on the basis of the servo signal, with the first bias voltage applied to the sample and with the servo circuit in the operating state. A first dependence of the tunnel current on the bias voltage is obtained, from the tunnel current signal and the second bias voltage, with the second bias voltage applied to the sample and with the servo circuit in the non-operating state. A second dependence of the tunnel current on the bias voltage is obtained from the tunnel current signal and the third bias voltage, with the third bias voltage applied to the sample and with the servo circuit in the non-operating state. Electron state data is obtained on the basis of the first dependence, and potential data is obtained on the basis of the first and second dependencies.

12 Claims, 18 Drawing Sheets

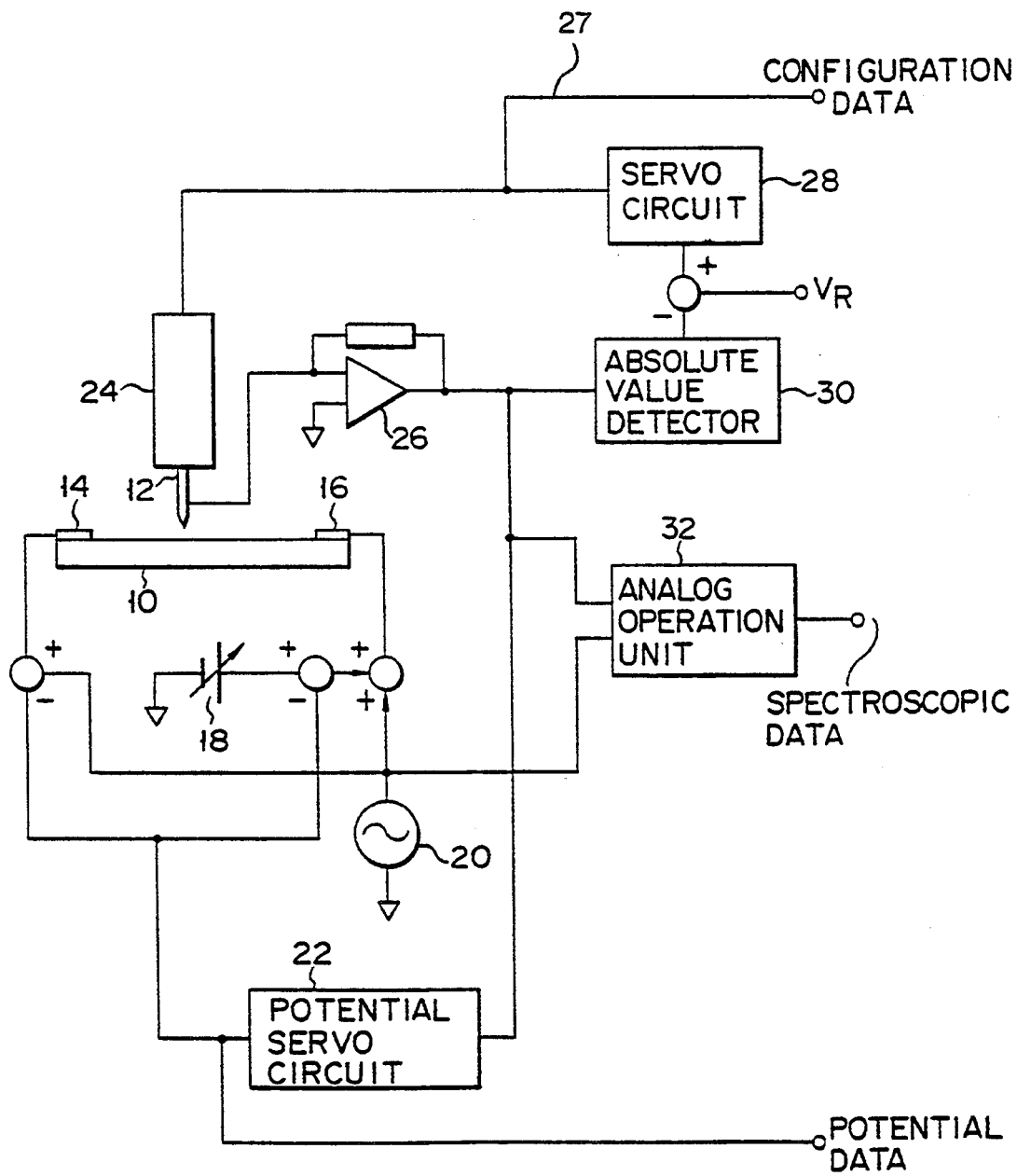
F I G. 1

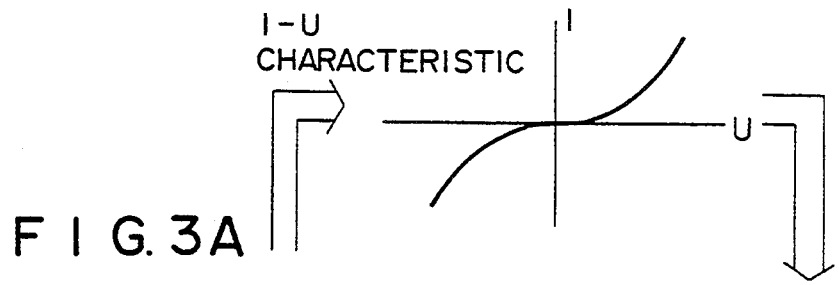
FIG. 3A
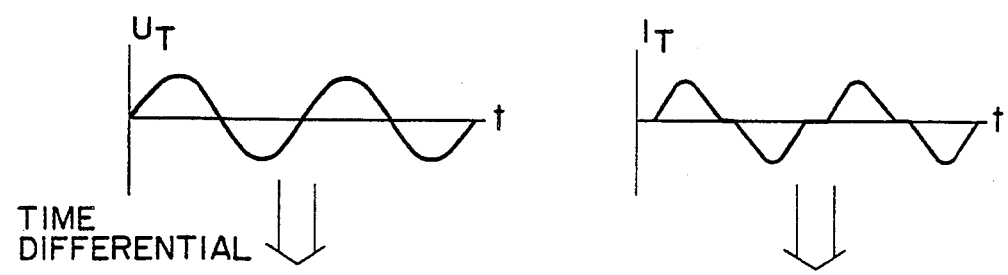
FIG. 3B  FIG. 3C
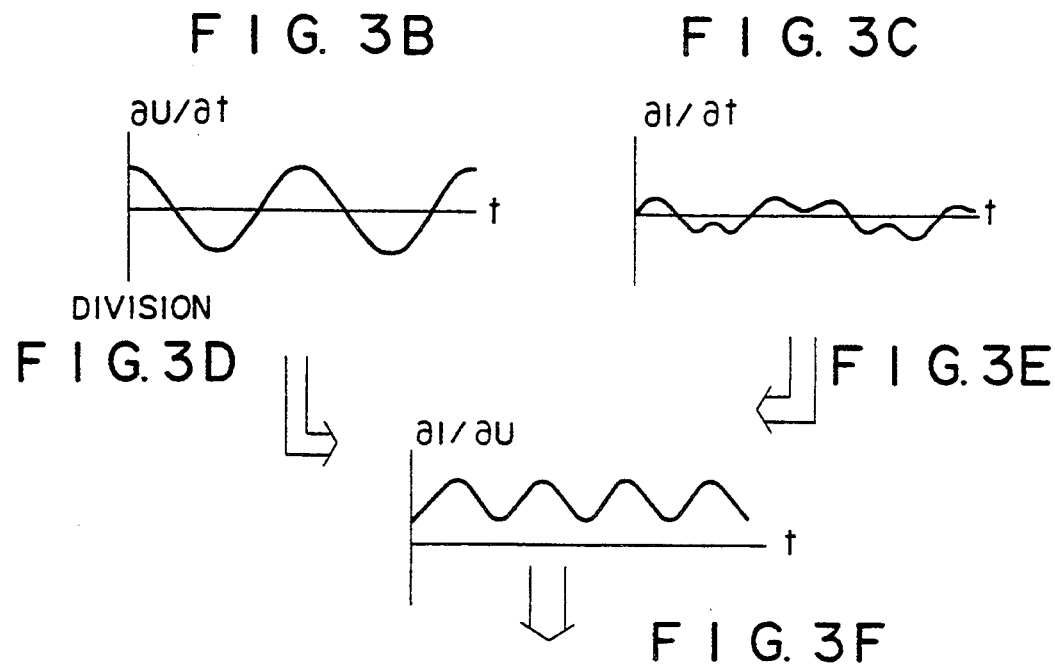
FIG. 3D  FIG. 3E
FIG. 3F
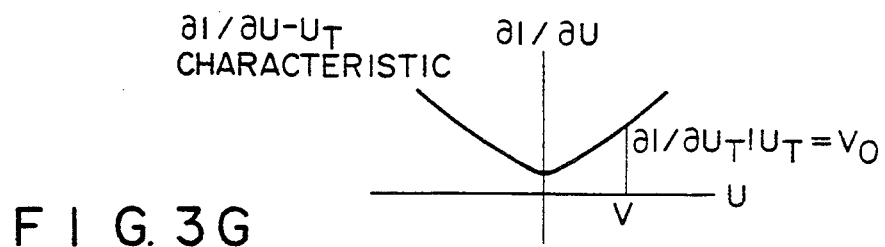
FIG. 3G

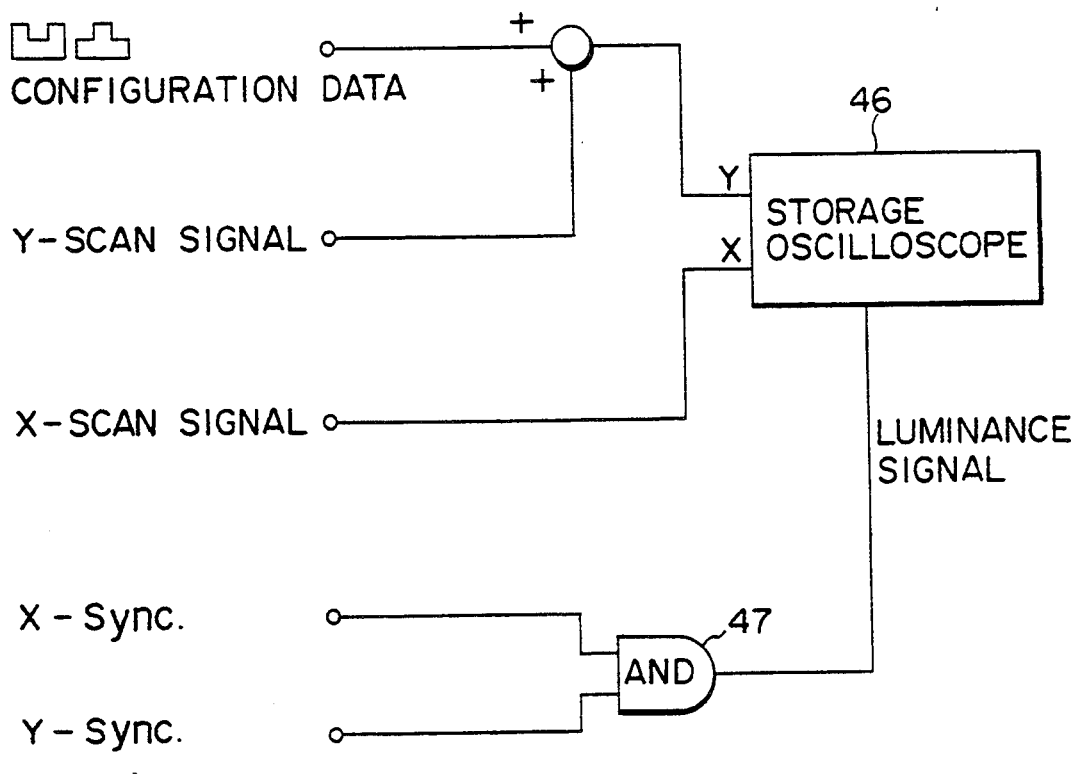
F I G. 5
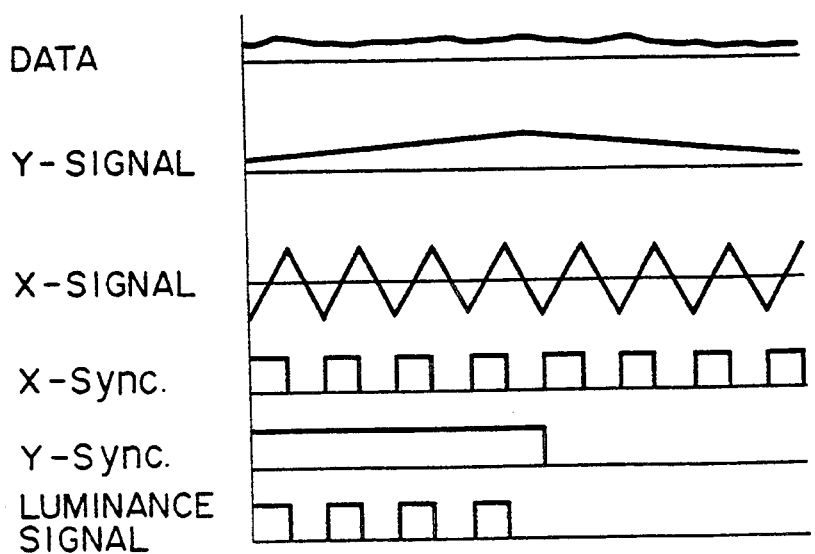
F I G. 6

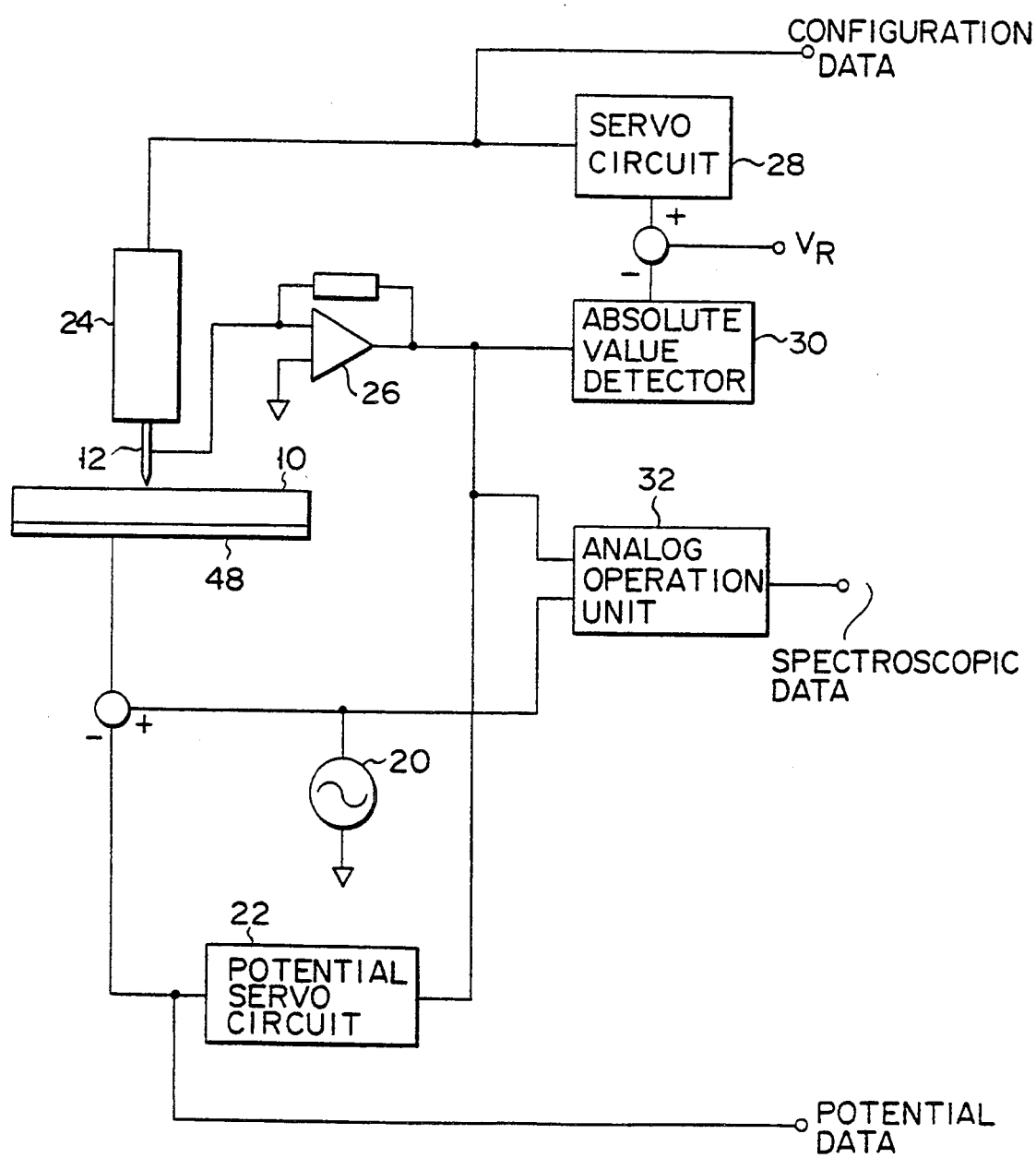
F I G. 8

FIG. 9A
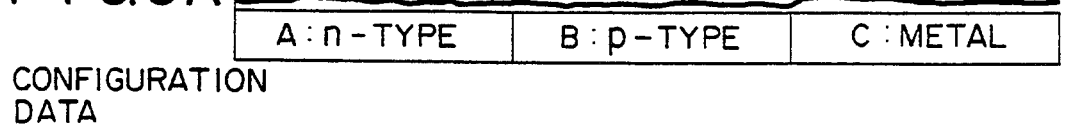
CONFIGURATION DATA
$I_T$-$U_B$
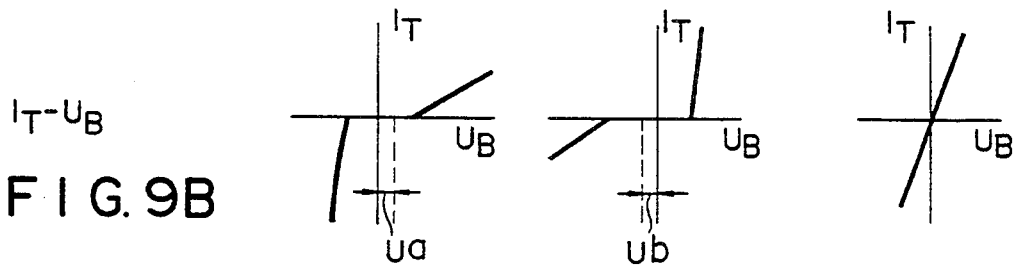
FIG. 9B
POTENTIAL DATA
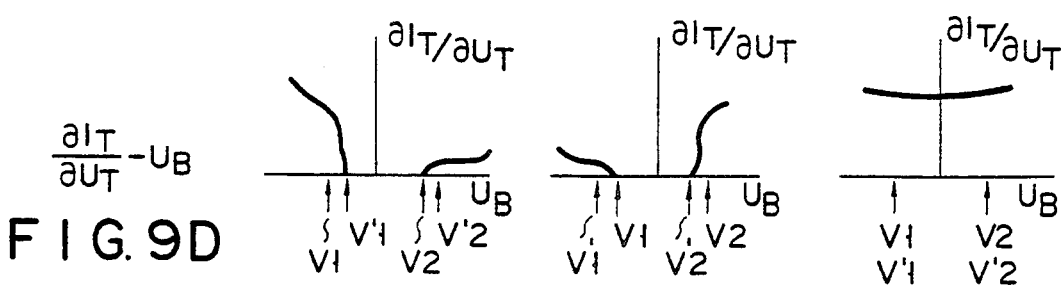
FIG. 9C
$\frac{\partial I_T}{\partial U_T}$-$U_B$
FIG. 9D
$\left.\frac{\partial I_T}{\partial U_T}\right|_{U_B=V1}$
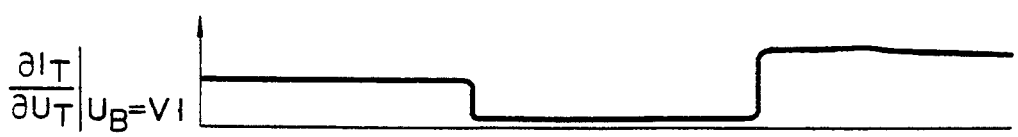
FIG. 9E
$\left.\frac{\partial I_T}{\partial U_T}\right|_{U_B=V2}$
FIG. 9F

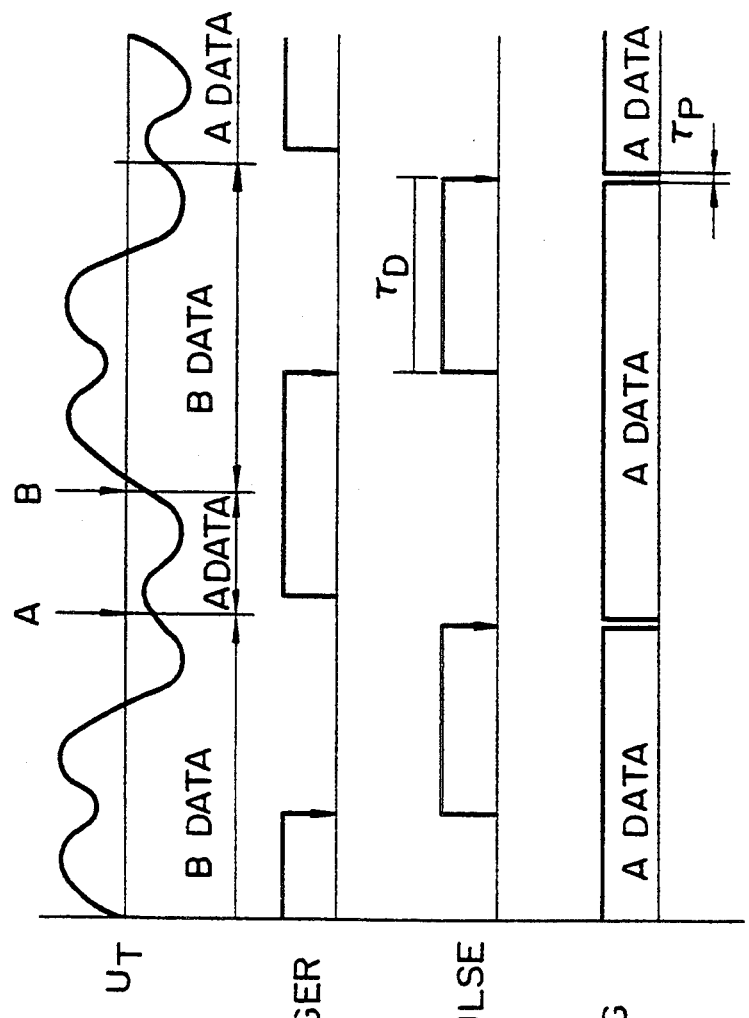

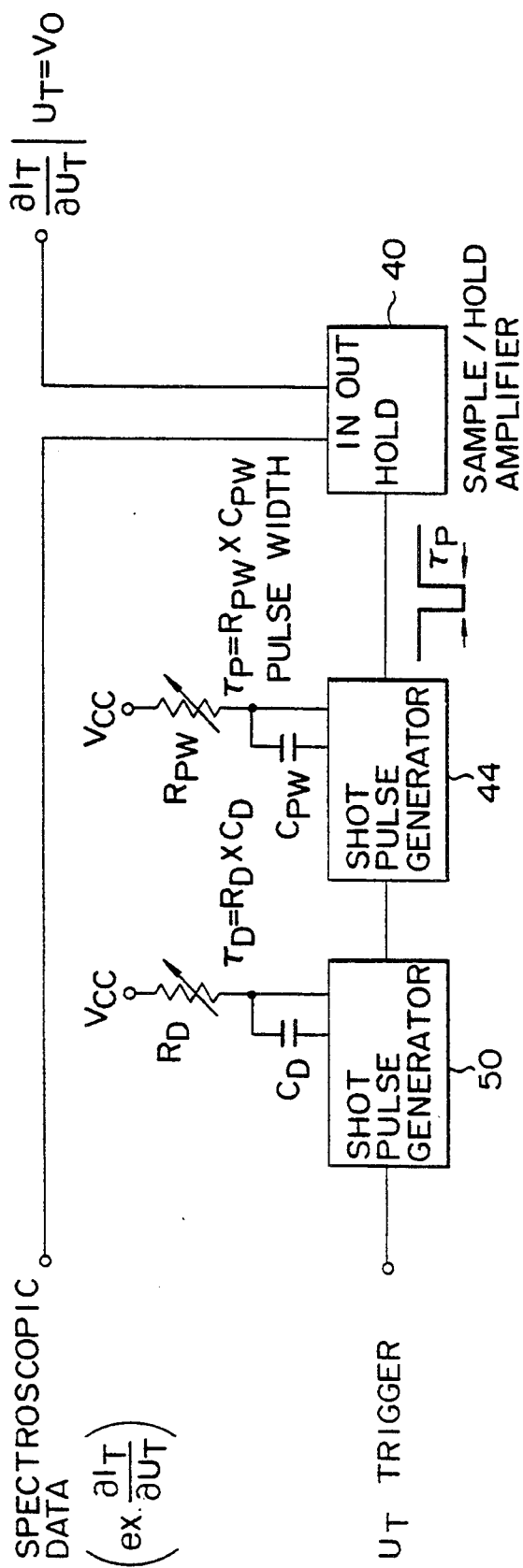
F I G. 11

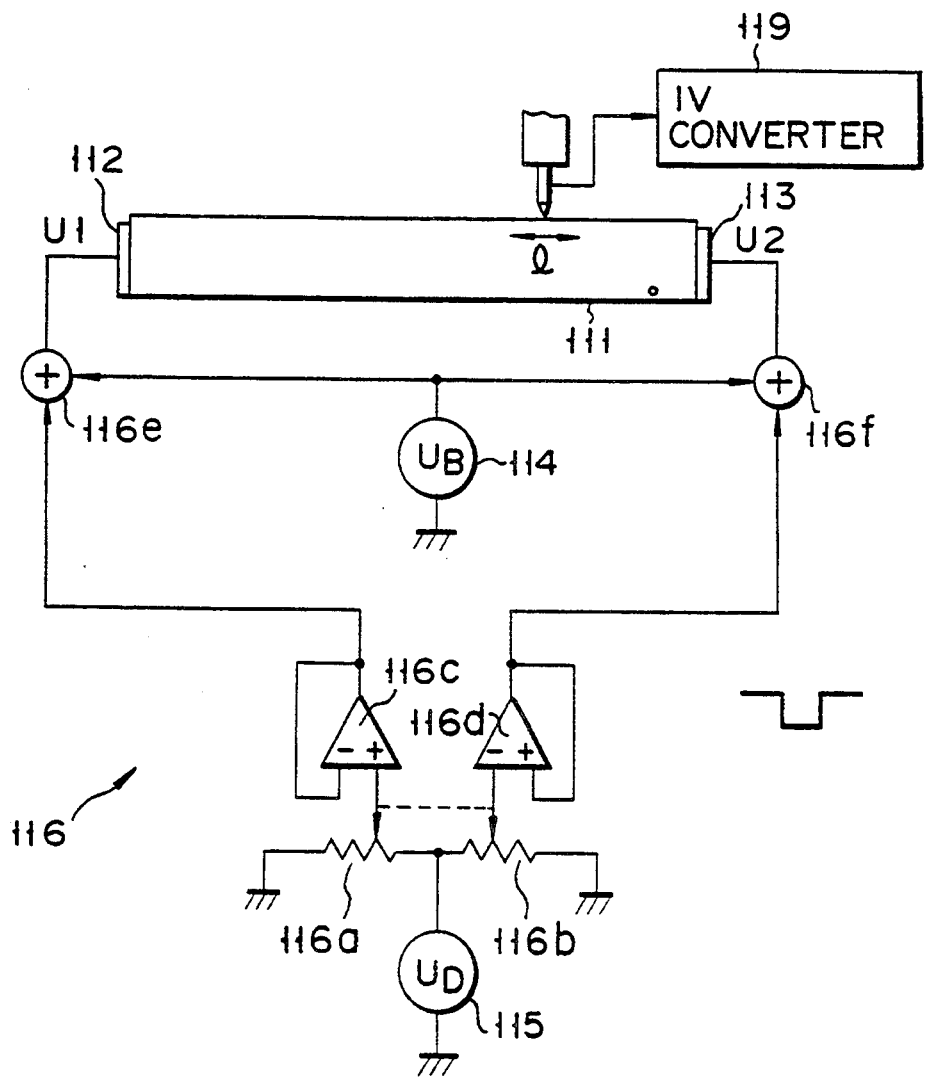
F I G. 14

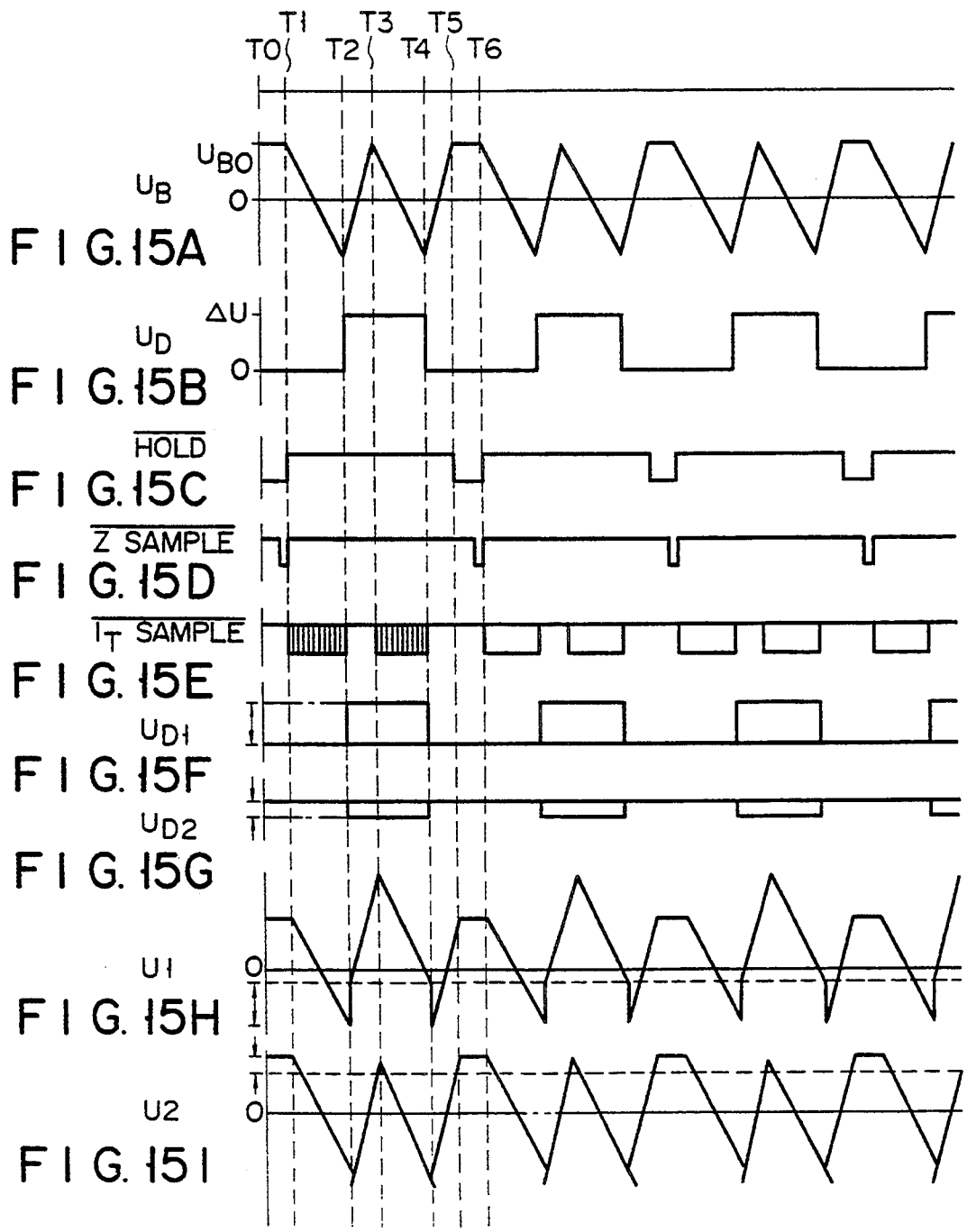

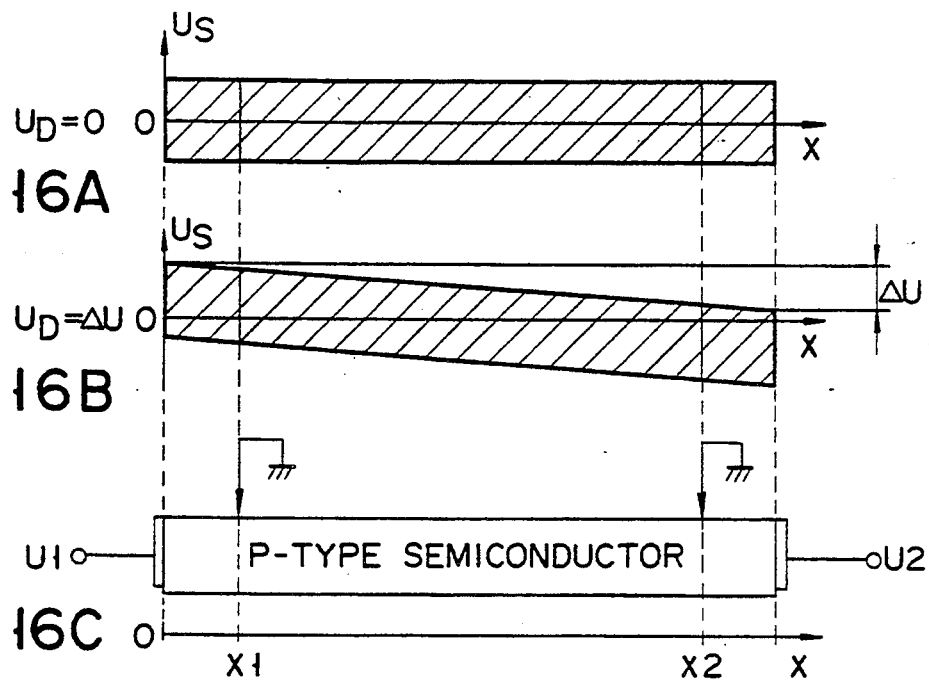
FIG. 16A
FIG. 16B
FIG. 16C
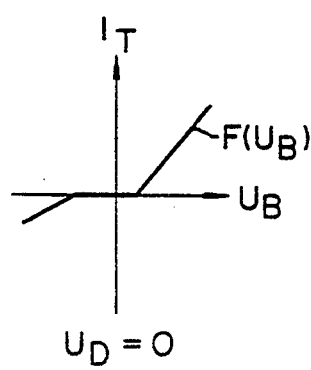
$U_D = 0$
FIG. 16D
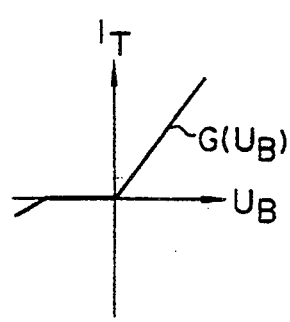
$U_D = \Delta U$
$U_S > 0$
$X = X1$
FIG. 16E
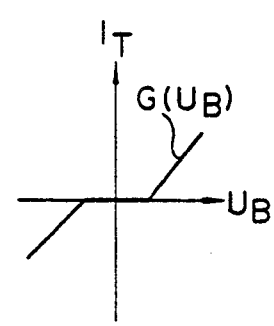
$U_D = \Delta U$
$U_S < 0$
$X = X2$
FIG. 16F

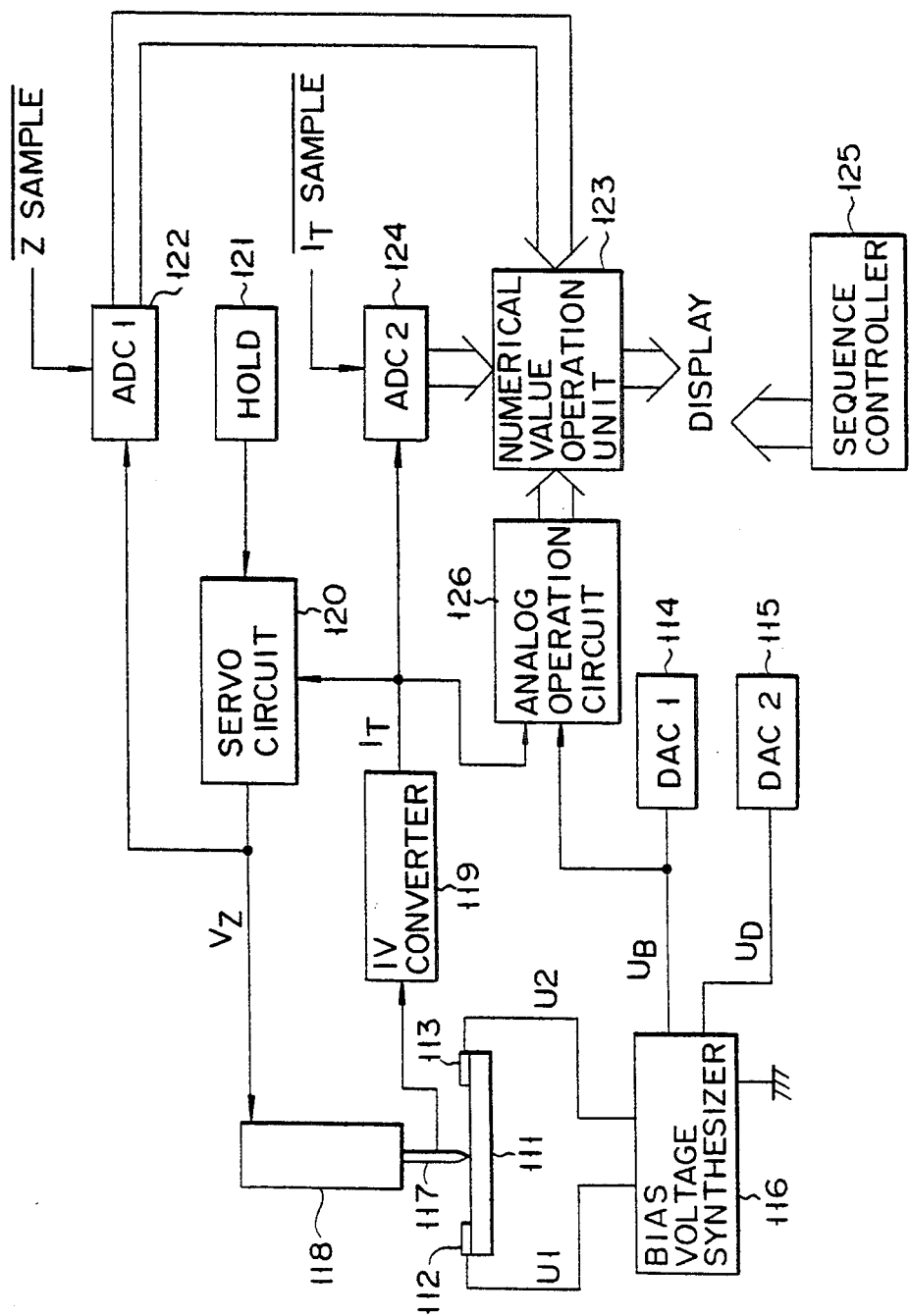
F I G. 18

SCANNING TUNNELING POTENTIO-SPECTROSCOPIC MICROSCOPE AND A DATA DETECTING METHOD

This is a division of application Ser. No. 07/585,880 filed Sep. 20, 1990 now U.S. Pat. No. 5,185,572.

BACKGROUND OF THE INVENTION

1. Field of the Invention

The present invention relates generally to a scanning tunneling microscope (STM) and more particularly to an apparatus having a basic function of an STM for determining a surface shape of an electrically conductive sample and also a function of determining the local potential distribution and the state of electrons on the surface of the sample.

2. Description of the Related Art

A scanning tunneling microscope (STM) is known as an apparatus capable of determining the surface shape of an electrically conductive sample with an atomic level resolution.

A pointed tip of an electrically conductive probe is positioned close to the surface of an electrically conductive sample at a distance of about 10 Å. When a bias voltage $U_B$ is applied between the probe and the sample, a tunnel current flows between the probe and the sample. As is represented by the following equation, a tunnel current $I_T$ depends on a distance $S$ between the probe and the sample exponentially:

$$I_T = \frac{U_B}{R_T} \exp(-BS\sqrt{\phi}) \quad (1)$$

where $B$ = a numerical coefficient of about $1.025/\text{Å}\sqrt{eV}$, $R_T$ = a tunnel resistance, and $\phi$ = a tunneling barrier height ($\phi = (\phi_1 + \phi_2)/2$; $\phi_1$: a work function of the probe, $\phi_2$ = a work function of the sample). The tunneling barrier height $\phi$ of a clean metal surface is about 1 to 5 eV. Thus, from equation (1), it is understood that when $S$ varies by 1 Å, the tunnel current $I_T$ varies by about one order. In the STM, the probe is moved over the surface of the sample or an xy plane by means of a fine-motion element such as a piezoelectric element. For example, the probe raster-scans the surface of the sample. During the scan, the distance $S$ between the probe and the sample is controlled with precision of less than 1 Å, so as to keep a constant tunnel current. Specifically, the probe or the sample is moved perpendicularly to the surface of the sample (i.e. in a z-direction) by means of the fine-motion element such as a piezoelectric element. As a result, the tip of the probe is kept away from the surface of the sample by a predetermined distance, and it traces a curved surface parallel to the surface of the sample. The curved surface reflects the surface shape of the sample. The positions of the tip of the probe on the xy-plane and in the z-axis, which are found from the voltage applied to the piezoelectric element, are recorded, thereby obtaining an atomic-order three-dimensional microscopic image or an STM image showing the surface shape of the sample.

When a sample having constant values of the tunneling barrier height $\phi$, tunnel resistance $R_T$ and bias voltage $U_B$ (shown in equation (1)), irrespective of locations on the sample, is measured, an obtained STM image reflects the configuration of the sample surface with fidelity. However, when most samples are measured, the surface potential distribution for determining the tunneling barrier height $\phi$, tunnel resistance $R_T$ and bias voltage $U_B$ varies locally. The tunnel current varies in accordance with the distance between a sample and a probe, microscopic electronic properties of the sample, and local potentials of the sample. Thus, a normal STM image contains data relating to microscopic roughness of the sample surface, variations in microscopic electronic properties, and a potential distribution.

Recently, there have been proposed scanning tunneling spectroscopy (STS) for obtaining an image representing a variation in electronic properties on the surface of a sample, on the basis of a tunnel current, and scanning tunneling potentiometry (STP) for finding a potential distribution on the surface of a sample on the basis of a tunnel current.

An example of STP is disclosed in "Scanning tunneling potentiometry", Appl. Phys. Lett. 48(8), 24 Feb. 1986, pp. 514–516. An example of STP using a time sharing method is disclosed in "Direct Measurement of Potential Steps at Grain Boundaries in the Presence of Current Low", Phys. Rev. Lett. Vol. 60, No. 15, 11 Apr. 1988, pp. 1546–1549.

STP is employed to determine a potential distribution on the surface (xy-plane) of a sample. On the basis of the determined potential distribution, a potential gradient on the xy-plane is calculated. The potential gradient reflects local resistance of the sample or the mobility of charge, but does not reflect the motion of charge in the z-direction. Since no data is obtained with respect to the local electronic state representing the properties of the sample, the properties of the sample cannot be identified locally. In addition, no data is obtained with respect to the charge energy state which contributes to the transmission of electric current.

On the other hand, an example of STS is disclosed in "Surface Electronic Structure of Si (111)-(7×7) Resolved in Real Space", Phys. Rev. Lett. Vol. 56, No. 18, 5 May 1986, pp. 1972–1975. This document teaches current-imaging tunneling spectroscopy (CITS) wherein an electronic density distribution is found from the dependency of tunnel current $I_T$ upon bias current $U_B$.

According to CITS, if a potential gradient is given to a sample, the dependency of tunnel current upon bias current is adversely affected locally by potential, and the original point for bias voltage scanning is displaced. As a result, absolute evaluation of the electronic state of the sample, using a zero level of bias voltage as a reference point, cannot be achieved. In addition, local potential of the sample cannot be identified.

SUMMARY OF THE INVENTION

Regarding STS, the inventors filed U.S. patent application Ser. No. 549,469 (title: "SCANNING TUNNELING SPECTROSCOPE AND A SPECTROSCOPIC INFORMATION DETECTION METHOD"). This application relates to spectroscopy capable of detecting a spectroscopic signal by use of a tunnel current which varies with the passage of time, depending on a bias voltage or a distance between a probe and a sample which also varies with the passage of time.

The present invention relates to an improvement of the above-described technique. The object of this invention is to provide a scanning tunneling potentio-spectroscopic microscope capable of acquiring surface configuration data, local electronic state data and local potential distribution data of a sample by a single probe scan, with an atomic-level resolution ultimately.

The scanning tunneling potentio-spectroscopic microscope according to the invention comprises means for applying to the sample a bias voltage including a modulated voltage having a predetermined waveform varying with passage of time at a predetermined cycle, means for detecting a tunnel current flowing between a probe and the sample, means for detecting an absolute value of the tunnel current, means for servo-controlling a distance between the sample and the probe on the basis of the absolute value of the tunnel current, with use of a time constant five times or more greater than the cycle of the modulated voltage, means for obtaining the configuration data of the sample on the basis of an output servo signal, means for controlling an off-set voltage for the bias voltage, thereby feedback-controlling the tunnel current so that the tunnel current may have an average value of zero in every cycle of the bias voltage, means for detecting local potential data of the sample on the basis of the off-set voltage, and means for obtaining differential conductance data by carrying out a real-time analog operation of differential conductance on the basis of the tunnel current and the modulated voltage.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 shows a basic structure of a scanning tunneling potentio-spectroscopic microscope according to a first embodiment of the present invention;

FIGS. 3A to 3G illustrate signals produced in the parts of the first embodiment;

FIG. 5 illustrates the flow of signals, when an image is produced by matching scan signals and measured data and is displayed on a storage oscilloscope;

FIG. 6 illustrates signals produced in the related parts when data is displayed on the oscilloscope;

FIG. 8 shows a structure of a scanning tunneling potentio-spectroscopic microscope according to a second embodiment of the invention;

FIGS. 9A to 9F illustrate material properties, for describing the second embodiment;

FIGS. 10A to 10D are timing charts for sampling in a third embodiment of this invention;

FIG. 11 shows a sampling circuit used in the third embodiment;

FIG. 14 shows an example of the structure of a bias voltage synthesizer;

FIGS. 15A to 15I are timing charts for describing the operation of the invention;

FIGS. 16A to 16F illustrate the operation of the invention when a sample of P-type semiconductor is employed;

FIG. 18 is a block diagram showing a scanning tunneling potentio-spectroscopic microscope having analog operation means.

DETAILED DESCRIPTION OF THE PREFERRED EMBODIMENTS

Figure 2:
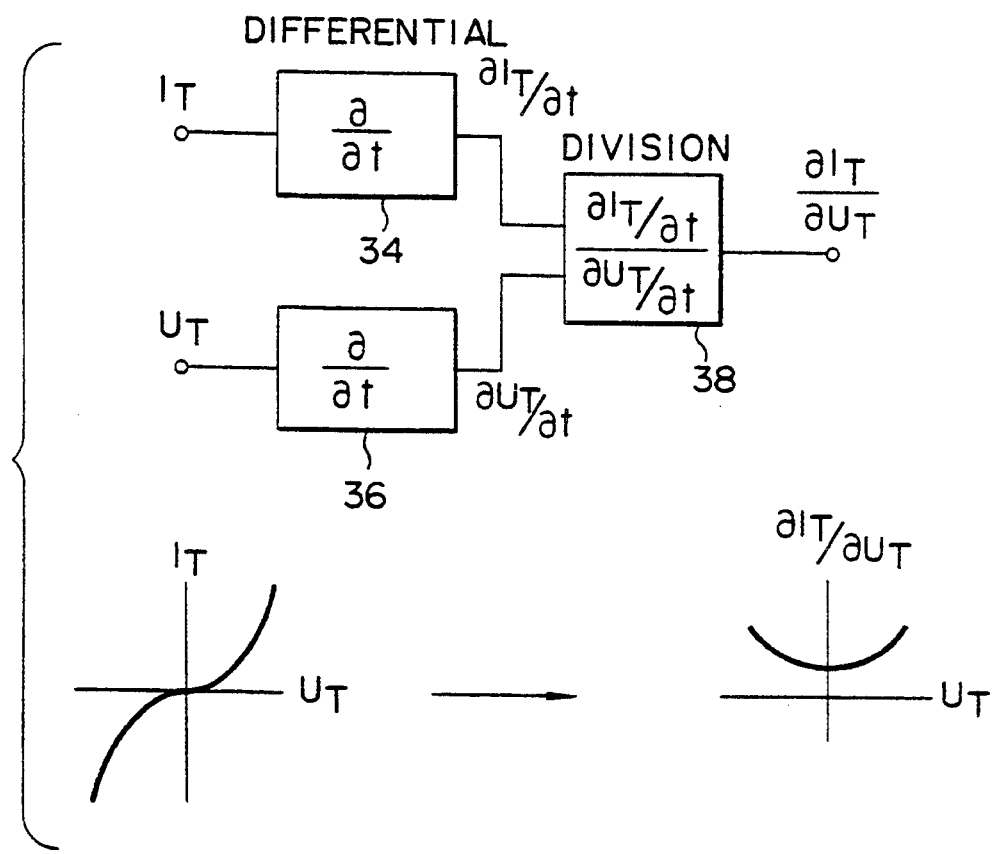
FIG. 2 shows a structure of an analog operation unit shown in FIG. 1.

A first embodiment of the present invention will now be described with reference to the accompanying drawings. In this embodiment, a sample having a surface, in which high-conductivity carbon portions and insulative binder portions are present mixedly, is determined.

As is shown in FIG. 1, electrodes 14 and 16 for applying a potential gradient $\Delta U$ and a bias voltage $U_B$ are provided on a sample 10. The electrode 14 is supplied with the bias voltage $U_B$ which is obtained by summing a sine-wave voltage $U_T \sin \omega_o t$ and an off-set voltage $U_{REG}$ output from a potential servo circuit 22. The electrode 16 is supplied with the sum of voltages $\Delta U$ and $U_B$ generated from a potential difference generator 18. Thus, the sample 10 is provided with a potential gradient in the x-direction. Specifically, the potential $U_1$ of the electrode 14 and the potential $U_2$ of the electrode 16 are given by the following equations:

$$U_1 = U_{REG} + U_T \sin \omega_o t$$

$$U_2 = U_{REG} + U_T \sin \omega_o t + \Delta U$$

The potential servo circuit 22 is of the integration type, and the response frequency of the potential servo circuit 22 is set to 1/5 or less of a bias modulation frequency, so that the off-set voltage may not coincide with the bias voltage modulation.

A probe 12 for scanning the sample 10, e.g. an electropolished probe made of PtIr, is supported above the surface of the sample 10 by means of a z-directional fine movement mechanism 24. In addition, the probe 12 can be moved by an xy-scan mechanism (not shown) in the x-direction (the horizontal direction in FIG. 1) and the y-direction (the direction of depth in FIG. 1).

The probe 12 having a zero potential approaches the surface of the sample 10 at a distance of several nm. A tunnel current corresponding to the potential difference between the probe 12 and the sample 10 is generated. The tunnel current is converted to a voltage by a current/voltage converter 26. The voltage is detected as a signal (hereinafter, called "tunnel current signal $I_T$"). Given that the potential difference between the electrode 14 and a surface portion of the sample 10, above which the probe 12 is situated, is $U_S(x)$, the average of $U_1 + U_S(x)$ becomes zero when the average of the tunnel current signal is zero. Accordingly, $<U_S(x) + U_{REG} + U_T \sin \omega_o t> = 0$, that is, $U_S(x) = -U_{REG}$. Using the average value of the tunnel current signal $I_T$, feedback is performed for the off-set voltage $U_{REG}$. The off-set voltage $U_{REG}$ is controlled so that the average value of the tunnel current becomes zero. Thus, $-U_{REG}$ is recorded, and the potential distribution $U_S(x)$ on the sample surface is determined.

While the probe 12 raster-scans the surface of the sample 10, the position of the probe 12 is servo-controlled in the z-direction by the z-directional fine movement mechanism 24, so as to keep the distance between the sample 10 and the probe 12 constant, that is, so as to make constant the average absolute value of the tunnel current oscillating with a basic frequency of $\omega_o$. As set forth below in connection with FIG. 5, the servo output signal on line 27 is synchronized with the xy-scan signal, and is displayed on an image display means such as an oscilloscope as surface configuration data, thereby obtaining a normal STM image representing the configuration of the sample surface. In order to prevent the distance between the sample 10 and the probe 12 from being influenced by oscillation of the tunnel current, the time constant of a feedback system comprising an absolute value detector (or an amplitude detector) 30 and a servo circuit 28 is set to a high value, i.e. five times or more the basic period of the bias voltage.

Spectroscopic data is obtained by an analog operation unit 32, on the basis of a differential conductance $\partial I_T/\partial U_T$ calculated from the tunnel current signal $I_T$ and the bias voltage $U_T$. The analog operation unit 32 has a circuit structure shown in FIG. 2. The principle of the operation of the analog operation unit 32 is illustrated in FIGS. 3A to 3G. The local characteristic of current-/voltage (I-U characteristic) across the sample and the probe has a peculiar waveform, as shown in FIG. 3A, depending on the location of atoms. When the sine-wave bias voltage $U_T$, as shown in FIG. 3B, is applied, the tunnel current signal reflects the I-U characteristic shown in FIG. 3A, as is shown in FIG. 3C. The tunnel current signal shown in FIG. 3C and the bias voltage shown in FIG. 3B are time-differentiated by differential circuits 34 and 36 shown in FIG. 2. Thus, a signal $\partial U_T/\partial t$ shown in FIG. 3D and a signal $\partial I_T/\partial t$ shown in FIG. 3E are obtained. These two signals are input to a division circuit 38, and a differential conductance $\partial I_T/\partial U_T$ shown in FIG. 3F is obtained.

STM data and STP data have single values at respective scan points; however, STS data has a value variable depending on the bias voltage. Under the situation, it is necessary to constantly output a differential conductance value corresponding to a specific voltage, by using a sampling circuit shown in FIG. 4. A sample/hold amplifier 40 receives the differential conductance value $(\partial I_T/\partial U_T)$ from the differential conductance operation circuit shown in FIG. 2. A bias voltage $U_T$ and a reference voltage $V_0$ are input to a comparator 42 and are converted to a binary signal. A shot pulse generator 44 generates a shot pulse having a pulse width $\tau p$, thereby enabling the sample/hold amplifier 40 to sample at a timing of $U_T = V_0$. Thus, the differential conductance value $(\partial I_T/\partial U_T | U_T = V_0)$ is always output at the time of $U_T = V_0$.

The scan speed of the probe is set so that the configuration servo system can respond to the variation in configuration of the sample surface, and the potential servo system can respond to the variation in local bias potential. Three display methods shown in FIG. 5 are employed to keep the distance between the sample and the probe constant, to set the potential of the sample in the vicinity of the tip of the probe to nearly zero, and to make the surface configuration data, the local potential value on the surface, and the differential conductance value at the bias voltage $V_0$ to correspond to the xy-scan signals. Thus, the spatial correspondency between the configuration image, local potential image and differential conductance image can be displayed and compared in real time.

According to the method of displaying the two-dimensional distribution of the configuration image, local potential image and spectroscopic image, a data signal is added to a y-scan signal, as shown in FIG. 5, and the resultant signal is input to a storage oscilloscope 46 as y-axis data in an xy-display mode. An x-scan signal is input to the storage oscilloscope 46 as x-axis data. Luminance points are made to remain in the storage mode. An x-trigger and a y-trigger are subjected to arithmetic operation in an AND gate 47, as shown in FIG. 5, and the output of the AND gate 47 is supplied to the storage oscilloscope 46 as a luminance signal. This realizes effective display in one scan direction.

Figure 7A:
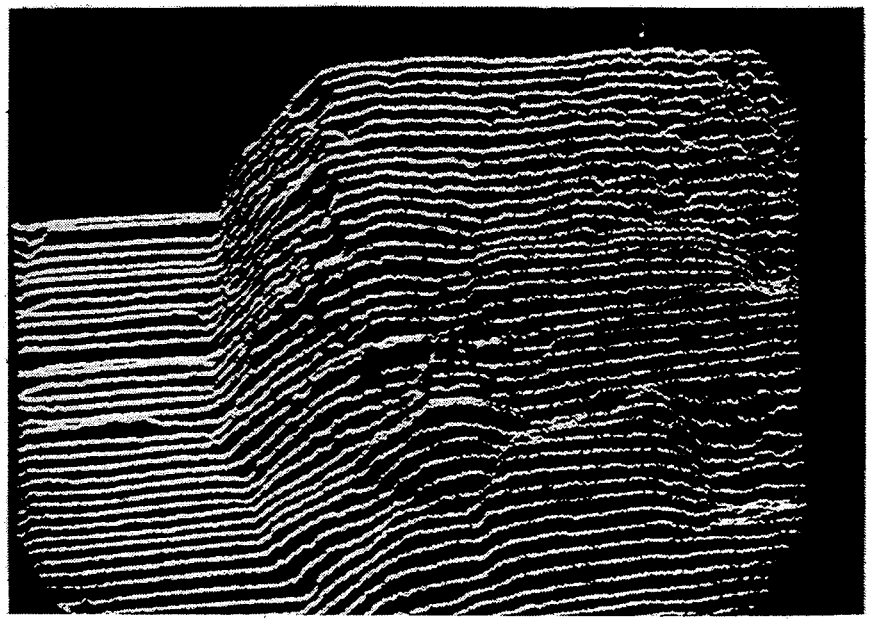
FIGS. 7A to 7C show the surfaces of carbon resistors.
Figure 7B:
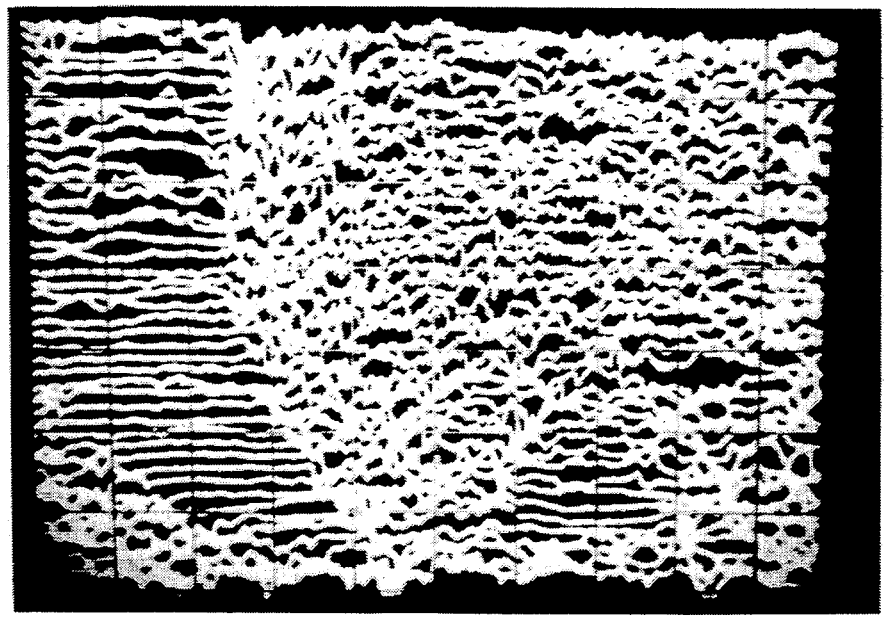
Figure 7C:
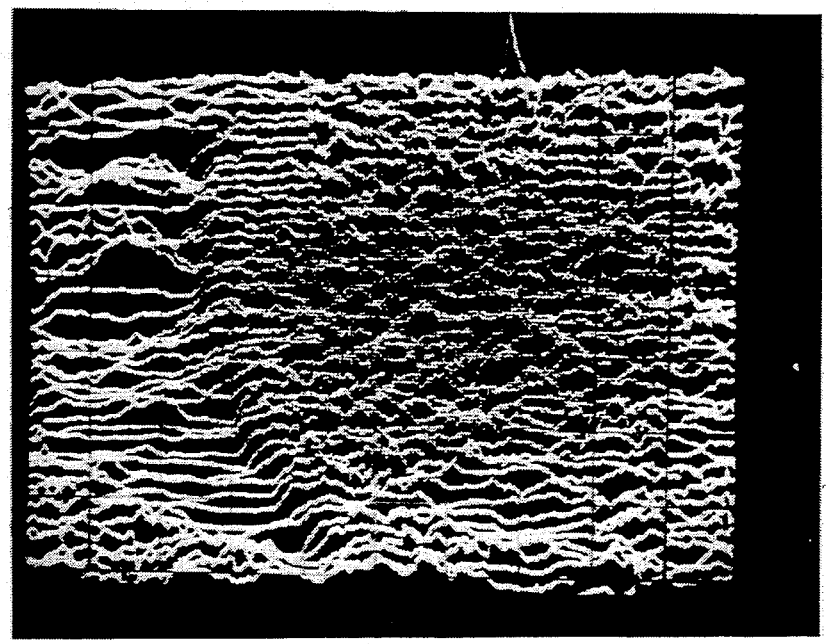

FIGS. 7A to 7C show a configuration image, a local potential image and a spectroscopic image of a region of 100 nm $\times$ 70 nm on a carbon resistor surface. These images were simultaneously obtained by the above display methods in the atmosphere of air.

When a determination is carried out, the modulated voltage $U_T$ is a sine-wave voltage having a frequency of 4.1 kHz and an intensity of 0.6 Vp−p. The average tunnel current is set to 5 nA. The potential gradient in the x-direction of the sample is 9 mV/100 nm. FIG. 7A shows a configuration of the sample surface, FIG. 7B shows the degree of differential conductance sampled at a modulated voltage of −50 mV, and FIG. 7C shows a potential distribution on the sample surface. When FIGS. 7A to 7C are compared, it is understood that in the left part of each image having a flat configuration the conductivity is high, the differential conductance is stable, and the variation in potential is small. On the other hand, in the right part of each image having a terrace-like configuration, the differential conductance is unstable, and the potential distribution varies sharply.

From the above, it is seen that the left part of each image corresponds to a carbon portion and the right part thereof corresponds to a binder portion to which carbon particles are adhered. By connecting analog operation data sampling circuits in parallel, the differential conductance can be sampled at a number of reference voltages independently. Thus, local values of differential conductance at a plurality of bias voltage levels can be simultaneously held. In other words, a number of spectroscopic images can be displayed simultaneously.

A second embodiment of the invention will now be described, wherein a sample, which is not provided with an artificial potential gradient, is determined.

As is shown in FIG. 8, a metal film 48 made of a high-conductivity material such as gold is formed on the bottom surface of the sample 10. The metal film 48 serves to make the potential of the bottom surface of the sample 10 uniform. Regarding this feature, the second embodiment differs from the first embodiment (FIG. 1) wherein the electrode for providing a voltage gradient is provided. In FIG. 8, the structural elements already shown in FIG. 1 are denoted by the same reference numerals. A configuration image, a potential image and a tunnel spectroscopic image obtained with the structure shown in FIG. 8 represent differences in material properties of the sample itself or of the surface of the sample.

FIGS. 9A to 9F are views for schematically explaining how images are seen on the basis of a conductance mechanism of the sample 10. As is shown in FIG. 9A, the sample comprises a region A of n-type semiconductor, a region B of p-type semiconductor, and a region C of metal. Referring to FIG. 9B, the $I_T$-$U_T$ characteristics of the region A and region B are asymmetrical. Thus, when potential feedback is carried so as to set the average tunnel current to zero, the off-set voltage $U_{REG}$ departs from zero potential. When the probe is scanned from the region A toward the region C, the potential data as shown in FIG. 9C is obtained. In the region A of n-type semiconductor and the region B of p-type semiconductor, the potentials are Ua and Ub respectively. In the region C of metal, the potential is zero, reflecting the asymmetrical current/voltage characteristics.

Figure 4:
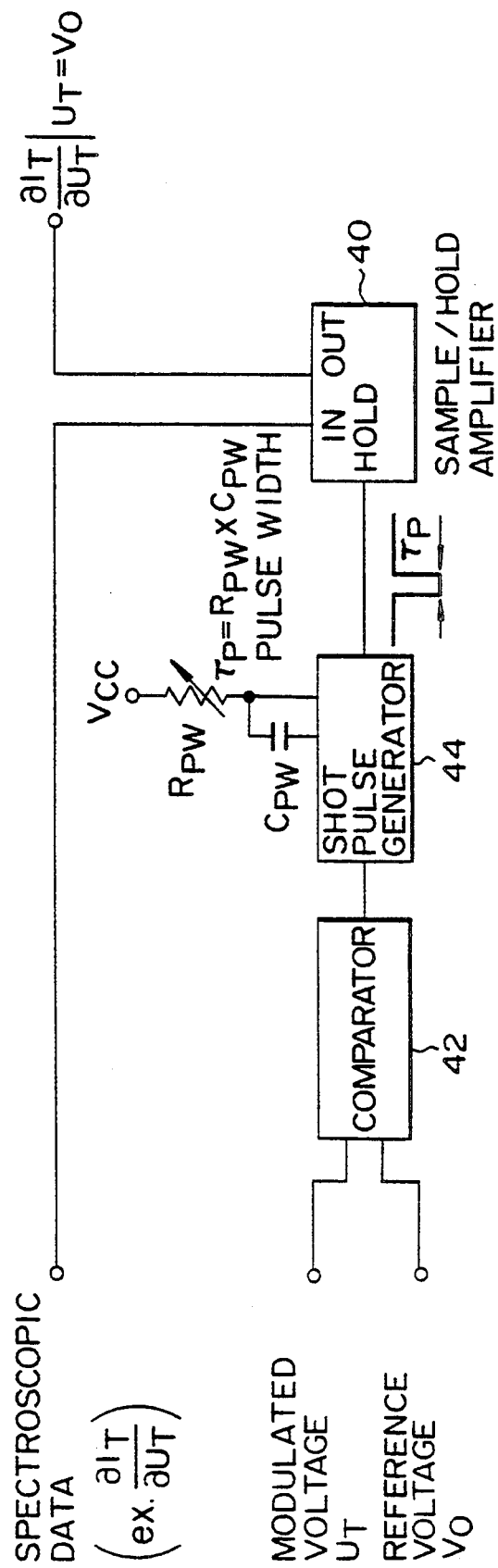
FIG. 4 is a block diagram of a sampling circuit used in the first embodiment.

FIG. 9D illustrates the dependency of the differential conductance upon the bias voltage. For the purpose of simplicity, suppose that when the modulated voltage reaches a specific voltage $V_0$, the differential conductance is sampled. In the respective regions, data is obtained when the actually applied bias voltage is $V_0+Ua$, $V_0+Ub$, and $V_0$. For example, referring to FIG. 9D, suppose that data is obtained when the bias voltage is $V_1$ and $V_2$. In this case, the sampling operation is carried out when the actually applied bias voltage is $V_{1'}$ and $V_{2'}$. When the modulated voltage $U_T$ applied to the comparator 42 shown in FIG. 4 is the bias voltage $U_B$, sampling is carried out at the timing of $V_1$ and $V_2$. Feedback control is performed for the bias voltage $U_B$, and when circuit noise is considerably great, a low-pass filter needs to be provided in the front stage of the comparator in order to prevent malfunction during the sampling operation.

FIGS. 9E and 9F show differential conductance data along the scanned cross sections of samples when sampling was conducted with the bias voltage $U_{V1}=V1$ and $U_{V2}$. As has been described above, even when the bias voltage is applied uniformly to the sample, the distribution of material properties of the sample can be determined from a number of obtained images.

A third embodiment of the invention will now be described. When material adhered or developed on the surface of a sample has a resonance point or a relaxation point at a specific frequency, STM measurement can be carried out, based on the difference in electrical frequency response of the material. When the bias voltage includes a plurality of frequency components, for example, when the bias voltage has a waveform of $U(\sin \omega_0 t + 0.5 \sin 3\omega_0 t)$ as shown in FIG. 10A, the tunnel differential conductance is detected thereby to discriminate the region with frequency dependency and the region without frequency dependency. In the case where the response of the tunnel current depends on the frequency, even if the probe is not moved, the signal value varies owing to the hysteresis of the bias voltage. Referring to FIG. 10A, suppose that there are two points, points A and B, at which the bias voltage values and the directions of voltage variation are equal. In this case, sampling pulses are generated at both points A and B, if the method employed in the first embodiment, in which sampling timing is determined on the basis of the bias voltage value, is carried out. As a result, it cannot be determined whether the final output signal is generated at point A or at point B. Under the situation, the measured values at points A and B are discriminated by use of a circuit shown in FIG. 11. In FIG. 11, a shot pulse generator 50 generates a pulse upon receiving a $U_T$ trigger. The width $\tau_D$ of the generated pulse is determined to a desired value. For example, when point A in FIG. 10A is determined, the width $\tau_D$ of the pulse from the pulse generator 50 is set such that a delay pulse (FIG. 10C) is output when a $U_T$ trigger (FIG. 10B) is input to the shot pulse generator 50. Thus, a sampling pulse $\tau_P$ (FIG. 10D) is output from the shot pulse generator 44. Since the measurement point can be selected by adjusting the pulse width $\tau$, the signal sampled in one period has a single value. By performing the sampling for STS with this method, STP can simultaneously be performed.

A fourth embodiment of the present invention will now be described with reference to FIG. 12. Electrodes 112 and 113 provided on a sample 111 are supplied with a synthesized voltage produced by synthesizing a tunnel bias voltage $U_B$ and a sample bias voltage $U_D$. The tunnel bias voltage $U_B$ is generated by a DA converter (DAC 1) 114 and is applied to the entire body of the sample 111. The sample bias voltage $U_D$ is generated by a DA converter (DAC 2) 115 and is applied across the electrodes 112 and 113. The sample bias voltage $U_D$ is divided by a bias voltage synthesizer 116 into voltages $U_{D1}$ and $U_{D2}$ at a suitable ratio. The tunnel bias voltage $U_B$ is added to the voltages $U_{D1}$ and $U_{D2}$, and the resultant voltages are applied to the electrodes 112 and 113.

A probe 117 is situated above the sample 111. The probe 117 is supported by a z-directional fine movement mechanism 118 so as to be movable in the z-direction (the vertical direction in FIG. 12). The probe 117 can be moved by an xy-scan mechanism (not shown) in the x-direction (the horizontal direction in FIG. 12) and in the y-direction (the direction of depth in FIG. 12).

The probe 117 is connected to an IV (current/voltage) converter 119. When the probe 117 is approached to the surface of the sample 111 at a distance of several nm and a tunnel current is generated between the sample 111 and the probe 117, the tunnel current is converted to a voltage signal (tunnel current signal) $I_T$. The voltage signal is applied to a servo circuit 120.

In response to a hold-on signal or a hold-off signal from a hold signal generator (Hold) 121, the servo circuit 120 turns on/off the servo operation. Specifically, the servo circuit 120 turns on the servo operation in response to the hold-off signal from the hold signal generator 121. The servo circuit 120 generates a servo voltage Vz to keep constant the tunnel current signal $I_T$ from the IV converter 119. The servo voltage Vz is applied to the z-directional fine movement mechanism 118. Thus, the distance between the probe 117 and the sample 111 is kept constant.

In synchronism with a Z sample signal, an AD converter (ADC 1) 122 receives the servo voltage Vz, which is generated from the servo circuit 120 when the tunnel bias voltage $U_B$ is applied from the DA converter 114 to the sample 111. The AD converter 122 digitizes the servo voltage Vz and supplies a digitized voltage to a numerical operation unit 123.

As has been stated above, while the distance between the probe 117 and the sample 111 is kept constant, the digital servo signal is stored in a memory in the numerical operation unit 123. This means that configuration data relating to the configuration of the surface of the sample 111 has been detected.

Once the configuration data at the position (measurement point) of the probe 117 has been detected, the hold-on signal is generated from the hold signal generator 121 and the servo operation in the servo circuit 120 is stopped. Consequently, the relative position between the probe 117 and the sample 111 is fixed. The tunnel current signal $I_T$, which is output from the IV converter 119 when the tunnel bias voltage $U_B$ applied to the entire body of sample 111 is varied, is received by an AD converter (ADC 2) 124 in synchronism with an $I_T$ sample signal. The AD converter 124 digitizes the tunnel current signal $I_T$ from the IV converter 119 and outputs the digitized signal to the numerical operation unit 123.

As stated above, in the state wherein the relative position between the probe 117 and the sample 111 is fixed, the digitized tunnel current data obtained when the tunnel bias voltage $U_B$ is varied is stored in the memory in the numerical operation unit 123. This means that the tunnel current/voltage characteristic has been detected in the case where no potential gradient is given to the sample 111.

Subsequently, the sample bias voltage $U_D$ having a predetermined value $\Delta U$ is applied from the DA converter 115 to the electrodes 112 and 113 on the sample 111, and the obtained tunnel current signal $I_T$ is applied to the AD converter 124. The AD converter 124 digitizes the tunnel current signal $I_T$ and outputs the digitized signal to the numerical operation unit 123.

In this way, the tunnel current data obtained when the sample bias voltage $U_D$ is applied to the sample 111 is stored in the memory. This means that the tunnel current/voltage characteristic has been detected in the case where a potential gradient is given to the sample 111.

When configuration data at a given measurement point and two tunnel current/voltage characteristics have been obtained, the probe 117 is moved and the above operation is repeated. Thus, data at each measurement point on the sample 111 is sequentially stored in predetermined areas in the memory.

In the numerical operation unit 123, the configuration data stored in the memory is plotted in relation to the coordinates of the measurement points, thereby obtaining an STM image of the sample 111, i.e. configuration data relating to microscopic roughness of the surface of the sample 111.

Immediately after the two kinds of tunnel current/voltage characteristics at each measurement point or all measurement points, the numerical operation unit 123 compares the tunnel current/voltage characteristics to find a voltage shift amount due to the provision of potential gradient. Thus, data relating to local potential distribution is obtained.

The numerical operation unit 123 also obtains conventional tunnel spectroscopic data, by using the tunnel current/voltage characteristic obtained when no potential gradient is provided. In addition, the numerical operation unit 123 corrects the tunnel current/voltage characteristic obtained when the potential gradient is provided, on the basis of the data relating to the local potential distribution, thereby obtaining data relating to the electronic state of the surface of the sample 111, which has been changed by the provision of the potential gradient.

Figure 12:
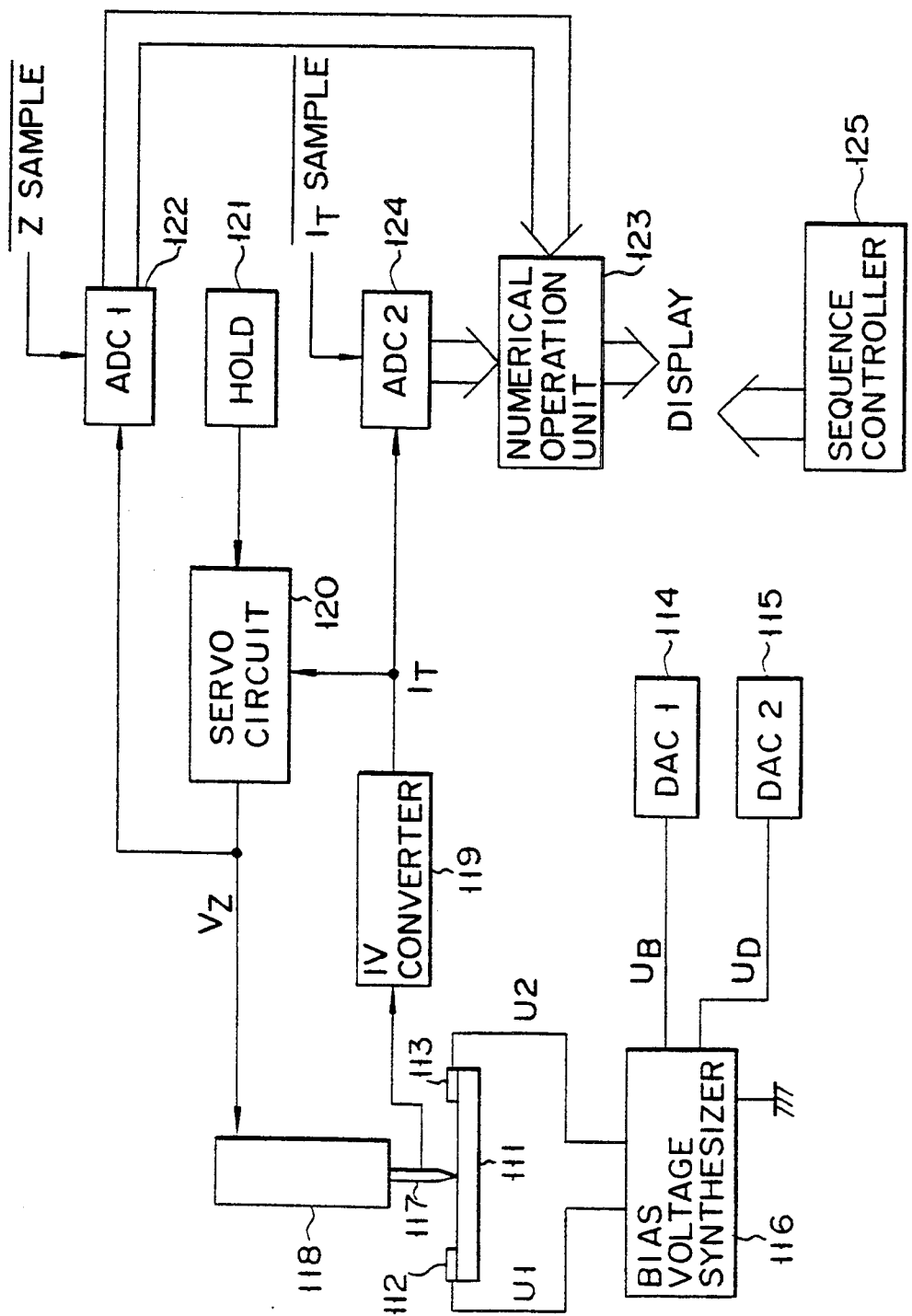
FIG. 12 is a block diagram showing a scanning tunneling potentio-spectroscopic microscope according to a fourth embodiment of the invention.

Referring to FIG. 12, a sequence controller 125 controls the DA converters 114 and 115, AD converters 122 and 124, and hold signal generator 121.

Figure 13:
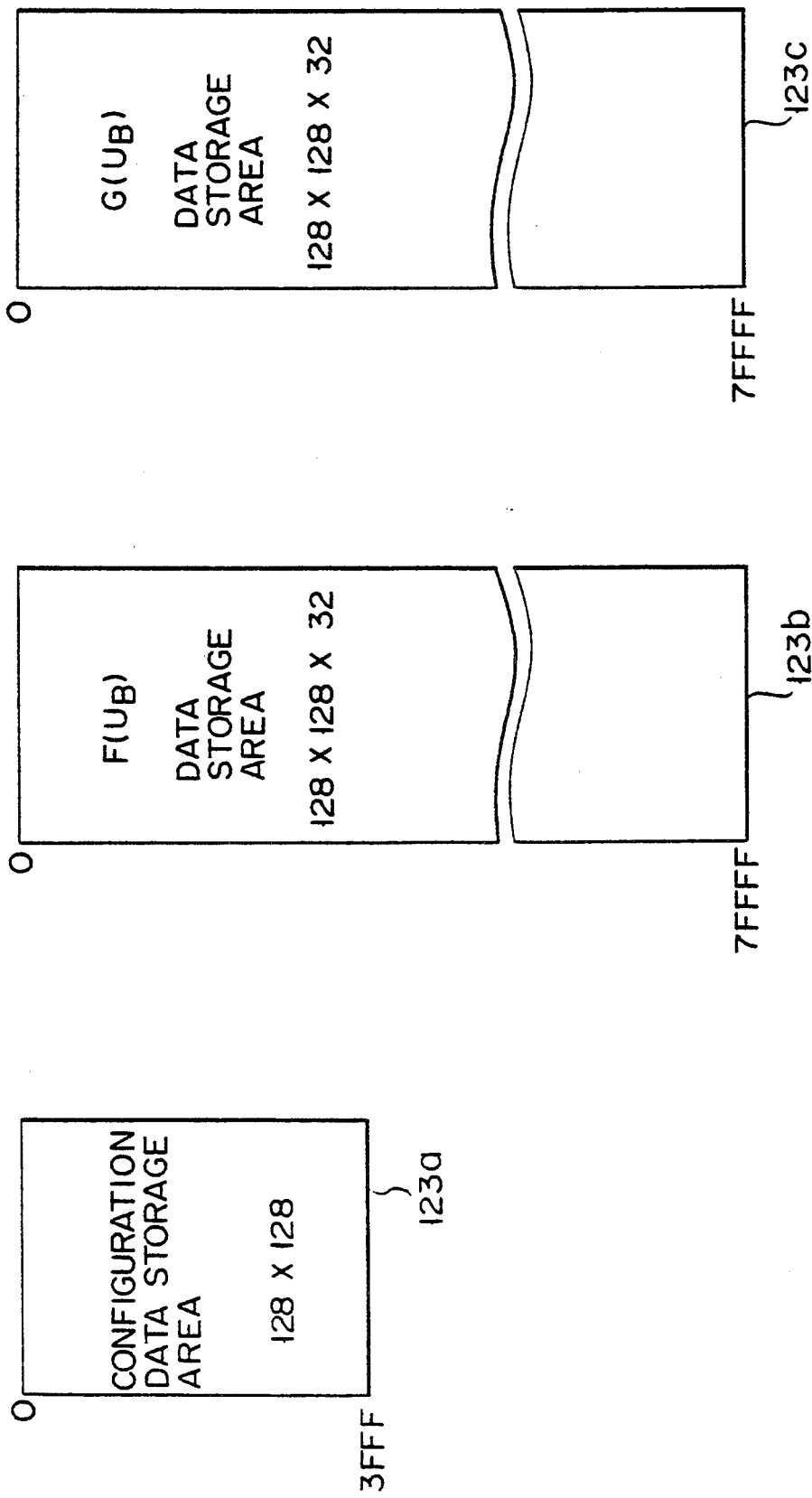
FIGS. 13A to 13C schematically show data memory areas in a memory.

FIGS. 13A to 13C schematically show the storage states of data units in the memory in the numerical operation unit 123.

The memory includes a configuration data storage area 123a, an $F(U_B)$ data storage area 123b, and a $G(U_B)$ data storage area 123c. The configuration data storage area 123a stores configuration data relating to the surface of the sample 111. The $F(U_B)$ data storage area 123b stores the tunnel current/voltage characteristic obtained when no potential gradient is given to the sample 111, in the form of the I-V characteristic function $F(U_B)$ of the sample 111 based on the tunnel current and bias current. The $G(U_B)$ data storage area 123c stores the tunnel current/voltage characteristic obtained when a potential gradient is given to the sample 111, in the form of the I-V characteristic function $G(U_B)$ of the sample 111 based on the tunnel current and bias current.

FIG. 14 shows the structure of the bias voltage synthesizer 116.

The bias voltage synthesizer 116 comprises a pair of interlocked variable resistors 116a and 116b for dividing the sample bias voltage $U_D$ generated from the DA converter 115 into signals of the same code; a buffer 116c and an inverter 116d for producing two signals $U_{D1}$ and $U_{D2}$ so that the sum of the absolute values of the signals from the resistors 116a and 116b becomes equal to the sample bias voltage $U_D$; and adders 116e and 116f for adding the tunnel bias voltage $U_B$ from the DA converter 114 to the two signals $U_{D1}$ and $U_{D2}$ and supplying the added signals $U_1$ and $U_2$ to the electrodes 112 and 113.

Referring to FIGS. 15A to 15I, the operation of the invention, in the case where the sample 111 is made of p-type semiconductor, will now be described.

In a time period T0–T1, for example, a tunnel bias voltage $U_B$ having a value $U_{B0}$ is generated from the DA converter 114. As is shown in FIG. 15B, a sample bias voltage $U_D$ generated from the DA converter 115 is 0 V. Thus, voltages $U_{D1}$ and $U_{D2}$, as shown in FIGS. 15H and 15I are generated by the bias voltage synthesizer 116 and are applied to the entire body of the sample 111 through the electrodes 112 and 113.

In this state, the probe 117 having a zero potential is approached to the surface of the sample 111 at a distance of several nm, thereby causing a tunnel current corresponding to a potential difference Us to flow between the probe 117 and the sample 111. The tunnel current is converted to a voltage signal (tunnel current signal) $I_T$ by the IV converter 119, and the voltage signal is applied to the servo circuit 120. In this case, a hold-off signal, as shown in FIG. 15C, is supplied from the hold signal generator 121 to the servo circuit 120. The servo circuit 120 performs the servo operation to control the distance between the probe 117 and the sample 111 so as to keep the tunnel current $I_T$ constant. Specifically, the distance between the probe 117 and the sample 111 is servo-controlled in the following manner. The tunnel bias voltage $U_B$ is set to $U_{B0}$ which ensures stable supply of the tunnel current. The sample bias voltage $U_D$ is set to zero. A servo voltage Vz for keeping the tunnel current signal $I_T$ constant is applied to the z-directional fine movement mechanism 118.

While the distance between the sample 111 and the probe 117 is servo-controlled, the servo voltage Vz is received by the AD converter 122 in synchronism with the Z sample signal shown in FIG. 15D, for example, just before time T1. The servo voltage Vz is converted by the AD converter 122 to a digital signal. The digital signal is supplied to the numerical operation unit 123 and is stored in the configuration data storage area 123a in the memory provided within the numeral operation unit 123.

Once the configuration data relating to a given measurement point has been detected, a hold signal, as shown in FIG. 15C, is generated from the hold signal generator 121. Subsequently, the servo operation of the servo circuit 120 is turned off, and the relative position between the sample 111 and the probe 117 is fixed.

In this state, in a time period T1-T2, the tunnel bias voltage $U_B$ is changed, as shown in FIG. 15A, with the sample bias voltage $U_D$ set to 0 V. The tunnel currents $I_T$ corresponding to the tunnel bias voltage $U_B$, which is varied, for example, with respect to 32 points $U_{BS0}$–$U_{BS31}$, are received by the AD converter 124 in synchronism with the $I_T$ sample signal shown in FIG. 15E. The tunnel current signals $i_T$ are converted by the AD converter 124 to digital signals. The digital signals are sent to the numerical operation unit 123 and are stored sequentially in the $F(U_B)$ data storage area 123b in the memory provided within the numerical operation unit 123. In other words, 32 tunnel currents $I_T$ obtained when the tunnel bias voltage $U_B$ is varied at points $U_{BS0}$–$U_{BS31}$ are detected as a function F of the tunnel current signal $I_T$ with respect to the tunnel bias voltage $U_B$ when the sample bias voltage $U_D$ is set to zero.

In this manner, 32 data sampling operations for $F(U_{BS0})$ to $F(U_{BS31})$ are carried out with respect to a given measurement point. After time T2, the sampling bias voltage $U_D$ is set to a specific value $\Delta U$, as is shown in FIG. 15B. As is shown in FIGS. 15F and 15G, the sample bias voltage $U_D$ is divided by the bias voltage synthesizer 116 into voltages $U_{D1}$ and $U_{D2}$ so that the potential difference of the sample 111 just below the probe 117 becomes zero or thereabouts. In addition, the sample bias voltage $U_D$ is added to the tunnel bias voltage $U_B$, thereby generating voltages U1 and U2 as shown in FIGS. 15H and 15I. The voltages U1 and U2 are applied to the electrodes 112 and 113.

In this state, in a time period T3-T4, the tunnel bias voltage $U_B$ is changed, as shown in FIG. 15A, with a potential gradient provided when the sample bias voltage $U_D$ set to $\Delta U$. The tunnel currents $I_T$ corresponding to the tunnel bias voltage $U_B$, which is varied, for example, with respect to 32 points $U_{BP0}$–$U_{BP31}$, are received by the AD converter 124 in synchronism with the $I_T$ sample signal shown in FIG. 15E. The tunnel current signals $I_T$ are converted by the AD converter 124 to digital signals. The digital signals are sent to the numerical operation unit 123 and are stored sequentially in the $G(U_B)$ data storage area 123c in the memory provided within the numerical operation unit 123. In other words, 32 tunnel currents $I_T$ obtained when the tunnel bias voltage $U_B$ is varied in a range of $U_{BP0}$–$U_{BP31}$ are detected as a function G of the tunnel current signal $I_T$ with respect to the tunnel bias voltage $U_B$ when the sample bias voltage $U_D$ is set to the specific voltage $\Delta U$.

In this manner, 32 data sampling operations for $G(U_{BP0})$ to $G(U_{BP31})$ are carried out with respect to a given measurement point. After time T4, the tunnel bias voltage $U_B$ is set to the initial value $U_{B0}$, as shown in FIG. 15A, and the sample bias voltage $U_D$ is reset to zero, as shown in FIG. 15B.

At time T5, the hold signal from the hold signal generator 121 is turned off once again, as shown in FIG. 15C. Then, the servo operation of the servo circuit 120 is restarted, and the probe 117 is moved in the x-y direction. Thus, the probe 117, while being servo-controlled, is moved to the next measurement point.

In the above manner, the sequential operation in the time T0-T5 is repeated at every measurement point. Thus, there are obtained the configuration data relating to the sample 111 at every measurement point and the local tunnel current/voltage characteristics at the time when the potential gradient is given to the sample 111 and when it is not given to the sample 111 (i.e. actually obtained $F(U_B)$ data and $G(U_B)$ data).

In FIG. 16A, a hatched part denotes the range of surface potential of the sample 111 in relation to the probe 117 of zero potential, when the tunnel bias voltage $U_B$ is applied to the sample 111 and the sample bias voltage $U_D$ is zero. On the other hand, in FIG. 16B, a hatched part denotes the range of surface potential when the sample bias voltage $U_D$ is set to a specific value $\Delta U$. Accordingly, when the sample bias voltage $U_D$ is zero, the measured $F(U_B)$ data stored in the storage area 123b is identical to the tunnel current/voltage characteristic obtained by conventional CITS. In other words, when the potential of the probe 117 is zero, the bias voltage between the sample 111 and the probe 117 is equal to the local potential $U_S$ of the sample 111 just below the probe 117.

The $F(U_B)$ data obtained when the potential gradient is not given and the $G(U_B)$ data obtained when the potential gradient is given have the relationship: $F(U_S+U_B)=G(U_B)$. When the local potential $U_S$ is greater than zero ($U_S>0$), the tunnel current/voltage characteristic at point x1 in FIG. 16C is as shown in FIG. 16E. That is, the $F(U_B)$ shown in FIG. 16D is shifted to the negative side by a degree corresponding to the local potential $U_S$.

On the contrary, when the local potential $U_S$ is lower than zero ($U_S<0$), the tunnel current/voltage characteristic at point x2 in FIG. 16C is as shown in FIG. 16F. That is, the $F(U_B)$ shown in FIG. 16D is shifted to the positive side by a degree corresponding to the local potential $U_S$.

The local potential distribution on the sample 111 can be obtained by finding the amount of shift of the functions $G(U_B)$ and $F(U_B)$ of the tunnel current/voltage characteristic, in the direction of the tunnel bias voltage $U_B$ at each measurement point. Specifically, 32 $F(U_B)$ data elements at each measurement point, obtained when the sample bias voltage $U_D$ is zero, are read out from the $F(U_B)$ data storage area 123b. Using the numerical operation unit 123, the read-out data elements are assigned to suitable functions, and then the functions are shifted in the direction of the tunnel bias voltage $U_B$ and are assigned to 32 $G(U_B)$ data elements at the present measurement point. The shift amount in the direction of the tunnel bias voltage $U_B$ represents the local potential at the measurement point. The shift amount is displayed, using the coordinates of the measurement points. Thus, a potential distribution image, or an STP image, is obtained.

The numerical operation unit 123 may find the local potential on the basis of the actual $F(U_B)$ and $G(U_S)$, in parallel with the sequential operation for data detection. In this case, during the data detection operation at each measurement point, the local potential is calculated by use of the data at the previous measurement point. Thus, the local potential distribution data can be obtained simultaneously with the data detection.

If the F($U_B$) data at the time when the sample bias voltage $U_D$ is zero is subjected to numerical differential, tunnel spectroscopic data (STS image) such as differential conductance at each measurement point can be obtained.

If the G($U_B$) data at the time when the potential gradient is constituted by the data relating to local potential and a fine difference between the G($U_B$) data and the F($U_B$) data is detected, there can be obtained data relating to the electronic state on the surface of sample 111 which varies by the provision of the potential gradient.

Figure 17A:
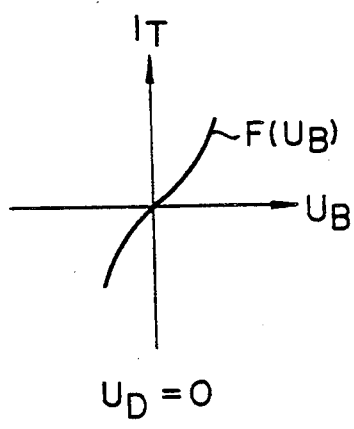
FIGS. 17A to 17C illustrate the operation of the invention when a sample of metal is employed.
Figure 17B:
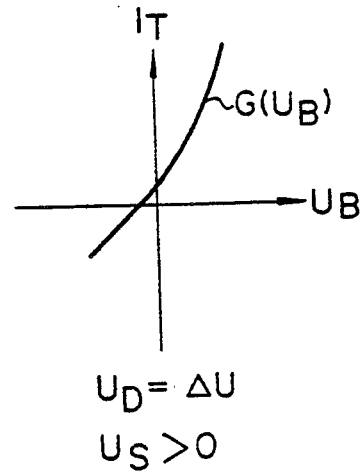
Figure 17C:
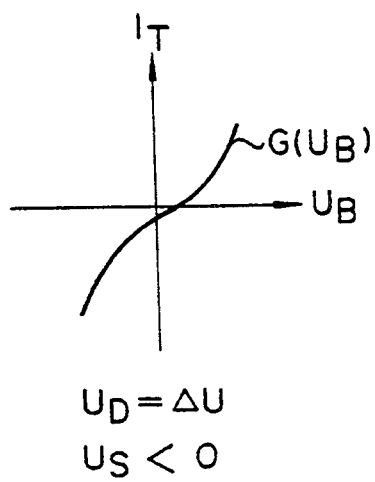

FIGS. 17A to 17C show examples in the case where the sample 111 is made of metal.

When the sample 111 is made of metal, the dependency of the tunnel current signal $I_T$ upon the tunnel voltage $U_B$, i.e. F($U_B$) data at the time when the sample bias voltage $U_D$ is zero, differs from that obtained when the sample 111 is made of semiconductor, as is shown in FIG. 17A. In this case, it is easier to determine the value of the tunnel bias voltage $U_B$ which sets the tunnel current signal $I_T$ to 0 [A].

FIG. 17B shows G($U_B$) when the sample bias voltage $U_D$ is set to a specific value $\Delta U$ and the local potential $U_S$ is positive ($U_S > 0$). On the other hand, FIG. 17C shows G($U_B$) when the sample bias voltage $U_D$ is set to a specific value $\Delta U$ and the local potential $U_S$ is negative ($U_S < 0$).

In the case of the sample 111 having a relatively simple tunnel current/voltage characteristic, the state in which no potential gradient is provided (i.e. tunnel bias voltage $U_B$ which sets the tunnel current signal $I_T$ to zero when the sample bias voltage $U_D$ is zero) is compared with the state in which the potential gradient is provided (i.e. tunnel bias voltage $U_B$ which sets the tunnel current signal $I_T$ to zero when the sample bias voltage $U_D$ has the specific value $\Delta U$). Thus, the data (STP image) relating to the local potential distribution on the sample 111 can be obtained.

From the tunnel current/voltage characteristic, the change in electronic state of the surface of the sample due to the presence/absence of a surface oxide film and/or an adhered substance can be detected.

FIG. 18 is a block diagram showing a scanning tunneling potentio-spectroscopic microscope having an analog operation circuit 126. The analog operation circuit 126 performs an analog operation to find a differential conductance on the basis of a tunnel bias voltage and a tunnel current. Thus, tunnel spectroscopic data can be output directly.

As has been described above, in the state wherein the relative position between the probe of the STM and the sample is fixed, the dependency of the tunnel current upon the tunnel bias voltage, in the case where the potential gradient is provided on the sample and it is not provided on the sample, can be detected in a wide range of voltage. As a result, there can be obtained configuration data relating to the microscopic roughness on the surface of the sample, as well as data relating to the tunnel current/voltage characteristic in the above-mentioned two states. The configuration data of the sample surface and the two kinds of tunnel current/voltage characteristics are analyzed, thereby obtaining the data relating to the local potential distribution on the sample, and the data relating to the dependency of the electronic property upon the bias voltage in the z-direction, i.e. the data relating to the local electronic state of the sample surface which varies owing to the potential gradient.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A scanning tunneling potentio-spectroscopic microscope, comprising:
   a conductive probe;
   bias voltage applying means for selectively applying one of first, second and third bias voltages to a sample;
   tunnel current detecting means for detecting a tunnel current flowing between said probe and said sample, and for outputting a tunnel current signal upon detection of said tunnel current;
   servo means for controlling a distance between said probe and said sample on the basis of said tunnel current signal by outputting a servo signal as a feedback signal;
   hold means for switching said servo means between operating and non-operating states;
   configuration data obtaining means for obtaining configuration data on a surface of said sample, on the basis of said servo signal, with said first bias voltage applied to the sample and with said servo means in the operating state;
   means for obtaining a first dependence of a tunnel current on the bias voltage, from said tunnel current signal and said second bias voltage, with said second bias voltage applied to the sample and with said servo means in the non-operating state;
   means for obtaining a second dependence of the tunnel current on a bias voltage, from said tunnel current signal and said third bias voltage, with said third bias voltage applied to the sample and with said servo means in the non-operating state; and
   means for obtaining electron state data on the basis of said first dependence of a tunnel current on the bias voltage, and for obtaining potential data on the basis of said first dependence and said second dependence of the tunnel current on a bias voltage.

2. The microscope according to claim 1, wherein said first bias voltage is constant and said second and third voltages are modulated in a range including zero potential.

3. The microscope according to claim 1, wherein said third bias voltage comprises an off-set voltage for providing said sample with a predetermined potential gradient and a modulation voltage, and said electron state and potential data obtaining means obtains the potential data on said sample by comparing a dependence of said tunnel current on said bias voltage when said off-set voltage is set at zero with a dependence obtained when said off-set voltage is set at a predetermined value.

4. The microscope according to claim 1, wherein said electron state and potential data obtaining means obtains the potential data on said sample on the basis of the value of said third bias voltage applied to said sample when the value of said tunnel current detected by said tunnel current detecting means is set at zero.

5. The microscope according to claim 1, wherein said electron state data obtaining means includes an analog-operating means for carrying out a real-time analog operation on the values of said tunnel current signal and said second bias voltage.

6. The microscope according to claim 1, wherein said configuration data obtaining means, said means for obtaining a first dependence, and said means for obtaining a second dependence include in common a single sequence controller.

7. The microscope according to claim 6, wherein said configuration data obtaining means, said means for obtaining a first dependence, and said means for obtaining a second dependence include in common a single numerical operation unit.

8. The microscope according to claim 7, wherein said configuration data obtaining means includes first convertor means for converting said servo signal into servo binary data and providing said servo binary data to said operation means in response to a servo sample signal sent out by said sequencer, and said means for obtaining a first dependence and said means for obtaining a second dependence include in common second convertor means for converting said tunnel current signal into tunnel current binary data in response to a tunnel current sample signal outputted by said sequencer.

9. A data detection method, comprising the steps of:
servo-controlling a distance between a probe and a sample by a servo means to set a tunnel current flowing between said probe and said sample at a predetermined value, applying a bias voltage to said sample, and detecting and memorizing a servo-signal corresponding to the distance between said probe and said sample as controlled by said servo means;
varying said bias voltage in a state in which said servo-controlling operation is stopped and a relative distance between said sample and said probe is fixed, digitizing data indicative of a dependence of said tunnel current on the variation of said bias voltage, and memorizing the digitized value of said data as first data;
varying said bias voltage in said state, applying an off-set voltage to said sample for providing the sample with a potential gradient, digitizing data indicative of the dependence of said tunnel current on the variation of said bias voltage, and memorizing the digitized value of such data as second data; and
obtaining information relating to configuration data on the surface of said sample from the servo signal, obtaining an electron state of a local area of said sample from said first data, and obtaining a potential of a determined area of said sample from said first and second data.

10. A data detection method, comprising the steps of:
servo-controlling a distance between a probe and a sample by servo means to set a tunnel current flowing between said probe and said sample at a predetermined value, applying a bias voltage to said sample, and detecting and memorizing a servo signal corresponding to the distance between said probe and said sample as controlled by said servo means;
varying said bias voltage in a state in which said servo-controlling operation is stopped and a relative distance between said sample and said probe is fixed, digitizing data indicative of a first dependence of said tunnel current on the variation of said bias voltage, and memorizing the digitized value of said data as first data;
varying said bias voltage in said state, applying an off-set voltage to said sample for providing the sample with a potential gradient, digitizing data indicative of a second dependence of said tunnel current on the variation of said bias voltage, and memorizing the digitized value of such data as second data; and
obtaining information relating to configuration data on a surface of said sample from the servo signal, obtaining an electron state of a local area of the sample from the first data, and obtaining a potential of said local area of the sample by detecting the voltage difference between two points respectively corresponding to where two curves representing said first dependence and said second dependence cross a zero-current line.

11. A tunneling potentio microscope, comprising:
a conductive probe;
bias voltage applying means for applying to a sample a tunnel-bias voltage which provides a flat potential to the sample, and a sample-bias voltage which provides a potential gradient to the sample;
tunnel current detecting means for detecting a tunnel current flowing between said probe and the sample, and for outputting a tunnel current signal upon detection of said tunnel current;
means for obtaining a first dependence of the tunnel current on a bias voltage, on the basis of said tunnel-bias voltage and the tunnel current signal, with said tunnel-bias voltage being continuously varied when applied to the sample;
means for obtaining a second dependence of the tunnel current on a bias voltage, on the basis of the tunnel current signal and a bias voltage which includes said tunnel- and sample-bias voltages, with both said tunnel- and sample-bias voltages being continuously varied when applied to the sample; and
means for obtaining potential data of the sample on the basis of said first and second dependencies of the tunnel current on the bias voltage.

12. The microscope according to claim 11, wherein said potential data obtaining means obtains the data by comparing said first and second dependencies, and calculating a shift in the potential with respect to said tunnel-bias voltage.

* * * * *